United States Patent [19]
Harris et al.

[11] Patent Number: 5,360,275
[45] Date of Patent: Nov. 1, 1994

[54] FILAMENT WOUND THRUST BEARING

[75] Inventors: Bernard Harris, Northbrook; Dennis E. Bozych, Downers Grove, both of Ill.

[73] Assignee: Rexnord Corporation, Milwaukee, Wis.

[21] Appl. No.: 990,420

[22] Filed: Dec. 15, 1992

[51] Int. Cl.$^5$ .............................................. F16C 33/20
[52] U.S. Cl. .................................................... 384/420
[58] Field of Search ............... 384/298, 276, 295, 296, 384/420, 911, 908, 909

[56] References Cited

U.S. PATENT DOCUMENTS

| | | | |
|---|---|---|---|
| 555,109 | 2/1896 | McGarry . | |
| 602,589 | 4/1898 | Sellers . | |
| 1,386,491 | 8/1921 | Brown, Jr. . | |
| 3,011,219 | 12/1961 | Williams | 18/59 |
| 3,131,978 | 5/1964 | White | 384/298 |
| 3,616,000 | 10/1971 | Butzow et al. | 156/173 |
| 3,697,346 | 10/1972 | Van Dorn et al. | 156/161 |
| 3,804,479 | 4/1974 | Butzow et al. . | |
| 3,891,488 | 6/1975 | White | 156/170 |
| 3,950,047 | 4/1976 | Capelli | 384/298 |
| 3,974,009 | 8/1976 | Butzow et al. | 156/84 |
| 4,040,883 | 10/1977 | Matt et al. | 156/148 |
| 4,054,337 | 10/1977 | Matt et al. . | |
| 4,189,985 | 2/1980 | Harris | 384/298 X |
| 4,495,381 | 1/1985 | Timoshenko et al. | 174/178 |

FOREIGN PATENT DOCUMENTS 967087 8/1964 United Kingdom .
1233102 5/1971 United Kingdom .

Primary Examiner—Thomas R. Hannon
Attorney, Agent, or Firm—Michael, Best & Friedrich

[57] ABSTRACT

A process for making an individual thrust bearing assembly having an inner race and a filament wound outer race integrally formed on the inner race for rotation relative thereto and to resist axial thrust loads and the bearing made thereby. To perform the process a mandrel is provided. An inner race that includes an outer peripheral surface having a bearing quality finish and one or more annular inner race axial thrust resisting areas is mounted on the mandrel. The formation of the outer race is initiated by applying a hardenable thixotropic resin to the outer peripheral surface of the inner race to fill the annular inner race axial thrust resisting areas and to form outer race axial thrust resisting areas mating with the inner race axial thrust resisting areas. The outer race is completed by applying an overlayment of filament wound fibers on the peripheral surface after application of the thixotropic resin to provide an unhardened elongated cylindrical member having an exterior surface of desired outside dimension with the annular inner race axial thrust resisting areas filled with the thixotropic resin. The cylindrical member is hardened to form a hardened outer race wherein the annular outer race axial thrust resisting areas comprise the hardened thixotropic resin.

4 Claims, 3 Drawing Sheets

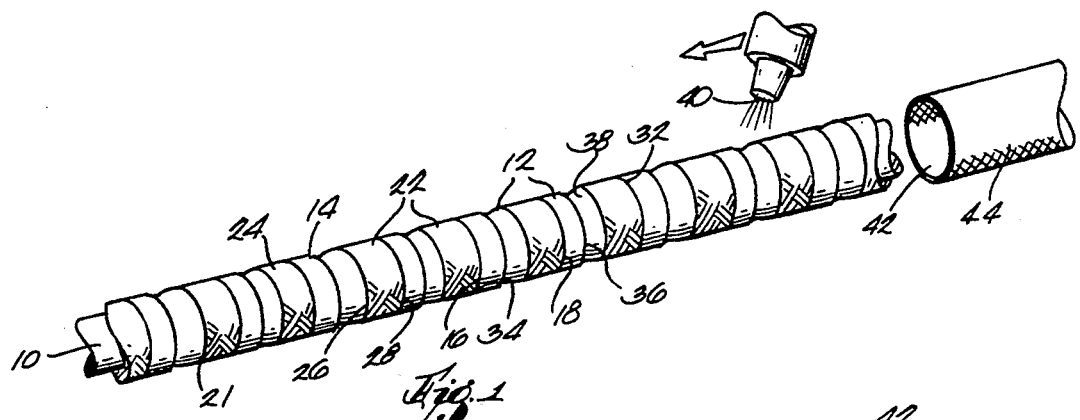
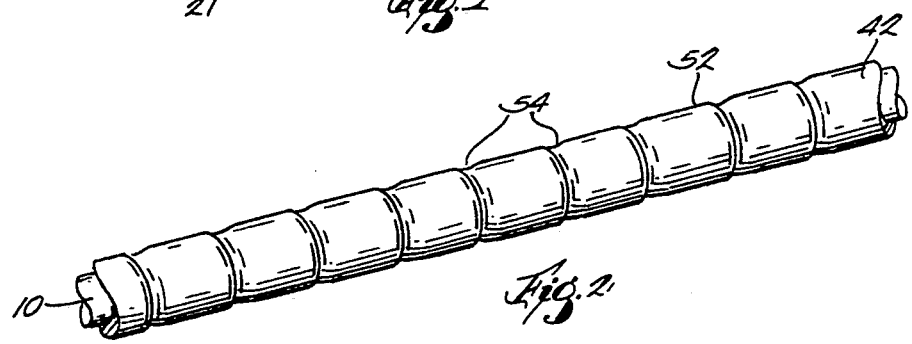
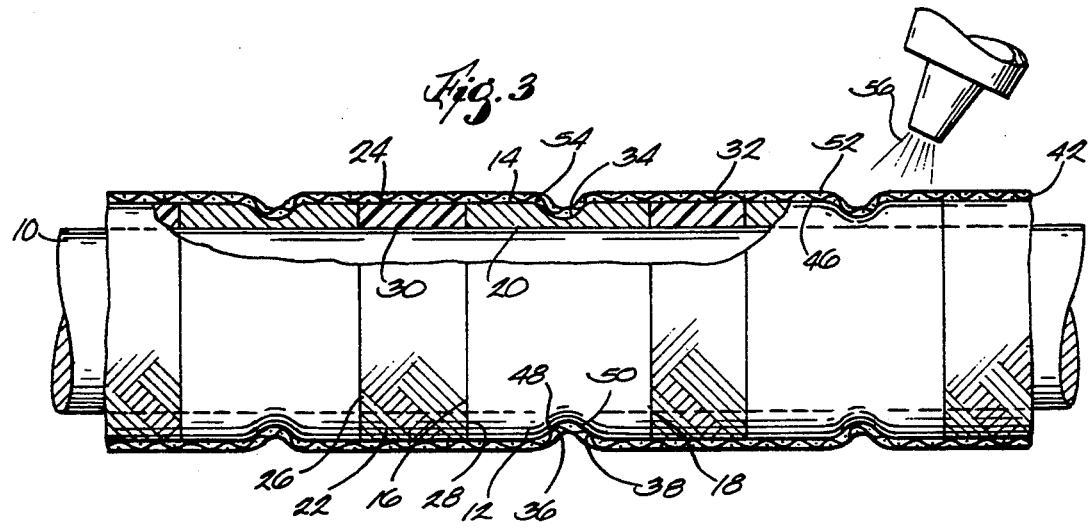
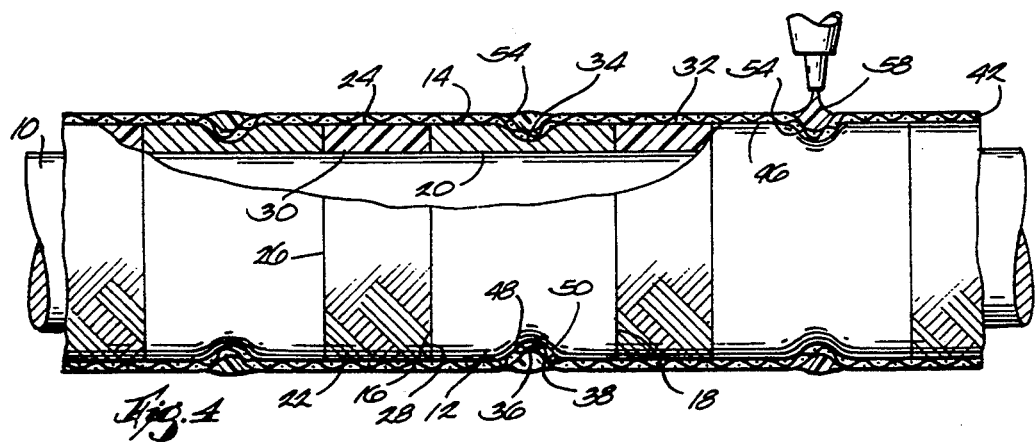

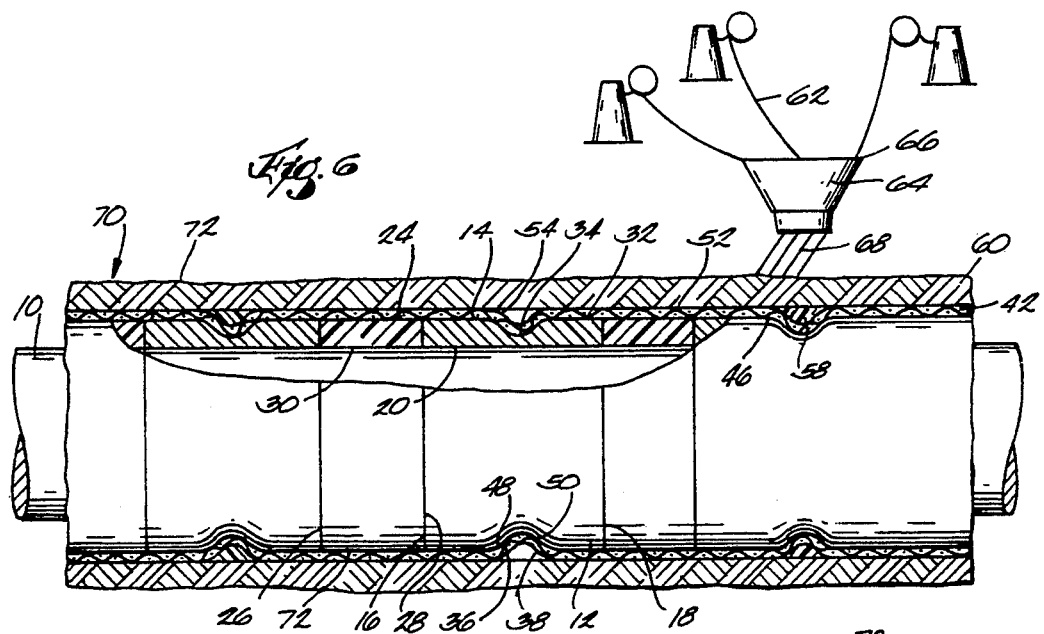
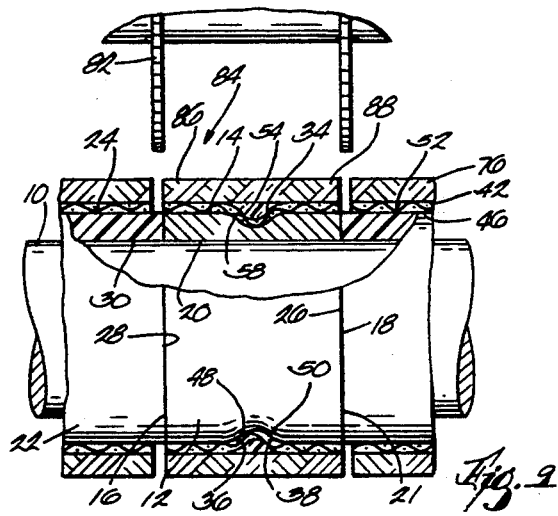
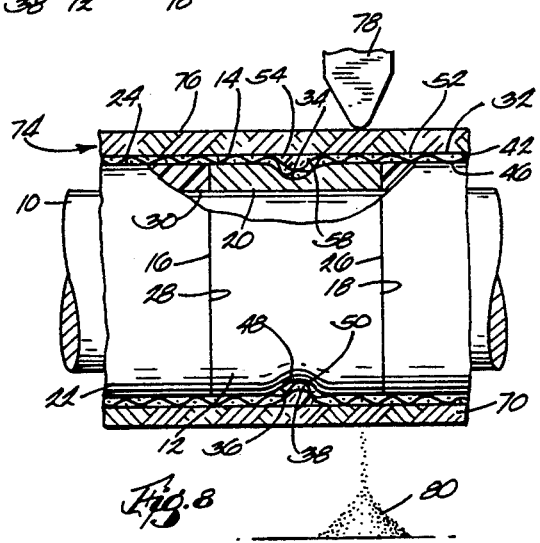
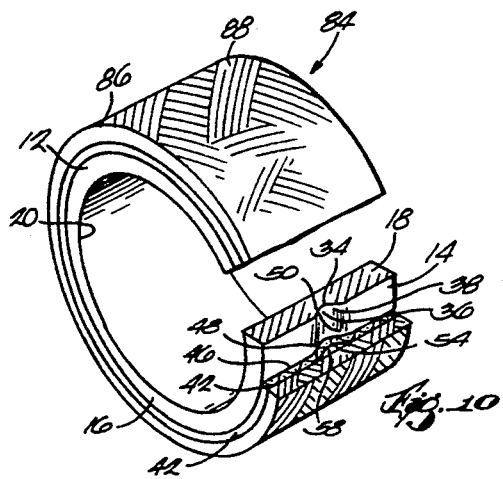
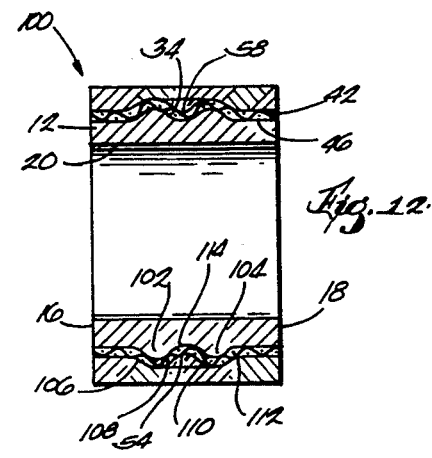

FILAMENT WOUND THRUST BEARING

BACKGROUND OF THE INVENTION

This invention relates to bearings, and, more particularly, to a method for producing a filament wound thrust bearing assembly having an inner race and an outer race integrally formed thereon and the bearing made thereby.

Thrust bearing assemblies comprise an inner member, or race having an axis and an outer race with the inner facing bearing surfaces of the inner and outer races having at least one axial thrust resisting means, or area. To permit relative rotational movement between the inner and outer race the adjacent bearing surfaces and thrust resisting area must be annular. When axial thrust is to be resisted bi-directionally, thrust resisting areas must be oriented to face both axial directions.

Bi-directional thrust resisting areas can be provided by forming the outer race over an inner race that has an outer surface having peripheral radial irregularities. The radial irregularities take the form of one or more annular troughs or grooves, or annular elevations or beads. The inner surface of the outer race is conformed to the inner race outer surface during formation of the outer race, and includes mating annular outer race axial thrust resisting areas mating with the annular inner race axial thrust resisting areas.

In U.S. Pat. No. 3,697,346, issued on Oct. 10, 1972, to H. B. Van Dorn et al, a method of making a composite thrust bearing is disclosed whereby a woven or braided fabric of a low friction material is applied over the outer surface of the inner bearing member. The body of the outer bearing member is built over the low friction surface by circumferentially wrapping resin-impregnated fiberglass over the fabric, curing and then finishing the outer member to desired axial and external conformations. The process integrally bonds the low friction fabric to the internal bearing surface of the outer member.

U.S. Pat. No. 4,054,337, issued on Oct. 18, 1977, to Matt et. al., and U.S. Pat. No. 4,040,883, issued on Aug. 9, 1977, also to Matt et. al., disclose thrust bearings comprising inner and outer races having a low friction fabric bonded to the inner surface of the outer race through a process comprising building up a filament wound body over the fabric, curing and then finishing to a desired external configuration.

In known methods for producing composite thrust bearings of filament wound outer races, the inner race outer surface grooves or the recessed areas between series of beaded elevations are filled by winding glass filaments at a low angle at or approaching circumferential or hoop windings. Unless such winding is used the filaments will bridge over the recessed areas which form the axial thrust resisting areas in the inner race outer surface. If bridging occurs, the annular axial thrust resisting areas on the inner race may be incompletely filled during the filament winding process, leaving voids which would reduce the ability to resist axial thrust forces. The presence of or the extent of such a defect could not easily be detected after only a few winding turns of the filament during the winding step in formation of the outer race.

A different problem arises, however, when the annular recessed areas are integrally filled by repeated low angled circumferential, or hoop windings of fiberglass filaments. When hoop windings are used the recessed areas will be filled with compacted filaments oriented in the same direction and lying in intimate contact with filaments above and below. Heating the fiberglass resin matrix cures the resin-fiberglass mix filling the annular recessed areas, fixing annular axial thrust resisting areas in the outer race which fill and mate with the annular inner race axial thrust resisting areas. The heat treatment of curing causes expansion of the inner race. During curing, the outer race of the fiberglass matrix is somewhat fluid and does not become solidified until the elevated cure temperature is achieved. At this elevated temperature the relative mating axial thrust resisting areas of the inner and outer races become fixed. Upon cooling, differential coefficients of expansion cause the steel inner race to contract more than the outer race of glass filaments. The coefficient of expansion for the composite fiberglass and resin material occupying the peripheral recessed areas in the inner race will approach that of the glass itself. After curing when the outer race is fixed into a rigid form, the cooling will cause very little relative contraction of the outer fiberglass occupying the peripheral recessed areas but will cause a relatively great contraction of the steel inner race. The coefficient of expansion of steel is approximately 6 to 6.3 times $10^{-6}$ inches/inch/°F., while the coefficient of expansion for glass is on the order of 2 times $10^{-6}$ inches/inch/°F.

Therefore, after cooling the annular outer race axial thrust resisting areas are tightly wedged within the mating annular inner race axial thrust resisting areas. This is because the coefficient of expansion of a steel inner race is approximately three times that of the cured fiberglass-resin composition of the outer race. Thus, the greater contraction of the steel member causes that portion of the outer member occupying the recessed areas of the peripheral surface of the inner member to be tightly compacted between annular thrust bearing surfaces. The wedge fit between the inner and outer members of the composite thrust bearing can become very tight, making it difficult or impossible to have relative rotational movement along the annular peripheral surface of the inner bearing member.

SUMMARY OF THE INVENTION

Among the objects of the invention is to provide an improved method of producing a composite thrust bearing having a filament wound outer race and a metallic inner race or inner member.

Another object of the invention is to provide such a process whereby the fit between the inner and outer bearing members can be controlled.

A still further object of the invention is to provide a composite steel and filament wound thrust bearing wherein the wound filaments of the composite fiberglass resin outer race are orientated to bridge over recessed areas in the peripheral surface of the inner race and do not fill the recessed areas of the annular inner race axial thrust resisting areas.

The achievement of these and other objects is provided by a method comprising the steps of mounting on a mandrel, an inner race that includes an outer peripheral surface having a bearing quality finish and one or more annular axial thrust resisting areas. A plurality of inner races may be so mounted each including an outer peripheral surface having a bearing quality finish and one or more annular axial thrust resisting means, or axial thrust resisting areas. The thrust resisting areas may comprise an annular groove or annular elevations.

Formation of the outer race is initiated by applying a hardenable high viscosity resin to the inner race outer surface to fill the recessed areas of the axial thrust resisting areas. The hardenable resin filling the irregularities may be thickened by combining a low viscosity resin with a thixotroping agent to provide a resin characteristics of a gel. The formation of the outer race is then completed by applying an overlayment of filament wound fibers on the surface of the outer race to provide an unhardened elongated cylindrical member having a substantially uniform exterior surface of desired outside dimension with the radial irregularities in the bonding surface filled with the thixotropic resin. A hardenable resin is applied to the filaments to fill any interstices. The filament wound fibers are applied to bridge over the annular grooves without displacing the thixotropic resin in the annular grooves.

The cylindrical member is hardened to form a hardened cylindrical member and the hardened cylindrical member is finished to desired outer dimension and contour by grinding and milling. Swarf produced from this finishing may be mixed with the resin to form the thickened fill resin for subsequent operations. The fiberglass swarf comprises a filler material and may be added to the thixotropic resin to create a filled thixotropic resin that is then applied to the recessed areas of the annular axial thrust resisting areas. By varying the amount of swarf added as a filler, the relative proportion of fiberglass in the thixotropic resin can be controlled. This feature can be used to choose a coefficient of expansion for cured resin forming the annular outer race axial thrust resisting areas in the recessed areas of the annular inner race axial thrust resisting areas, and in this manner the degree of tightness between inner and outer races in the finished bearing can be predictably and repeatedly chosen.

When a plurality of bearings are being produced the cylindrical member is severed at adjacent bearing interfaces, either before or after removal from the mandrel, to create a plurality of individual thrust bearing assemblies wherein the axial thrust resisting areas are filled by the hardened thixotropic resin in the outer race.

A layer of self-lubricating conformable material may be applied on the outer peripheral surface of the inner race to form a low friction bearing liner having intimate conformation with the outer peripheral surfaces and an exposed bonding surface that includes radial irregularities at the axial thrust resisting areas, This liner of self-lubricating material preferably includes self-lubricating and shrinkable materials formed into a woven tubular sleeve that is slid axially over the outer peripheral surfaces of the plurality of inner races, The woven sleeve of self-lubricating and shrinkable materials is then shrunk onto the outer peripheral surface, A low viscosity hardenable bonding resin is applied over the fabric surface to wet the exposed bonding surface and penetrate the fibers of the fabric, The hardenable thixotropic resin is then applied to the exposed bonding surface of the conformed bearing liner to fill the radial irregularities therein. The outer races are completed by applying the overlayment of filament wound fibers on the bearing liner after application of the bonding and thixotropic resins. The overlayment is cured and finished resulting in a thrust bearing assembly having axial thrust resisting areas comprising the bearing fabric liner supported by the hardened bonding and thixotropic resins used to fill the radial irregularities.

The thrust bearing assembly provided by the process generally comprises an inner race including an outer peripheral surface having one or more annular axial thrust resisting areas and an outer race conformed to and rotatably mounted on the outer peripheral surface, the outer race having annular axial thrust resisting areas in the area of its conformation to the annular axial thrust resisting areas of the inner race. The outer race annular axial thrust resisting areas are filled with a hardened thixotropic resin. A major body portion surrounds the outer race annular axial thrust resisting areas and comprises resin-impregnated filament wound fibers bonded to the hardened thixotropic resin. A bearing liner of self-lubricating material may be conformed to and rotatably mounted on the outer peripheral surface of the inner race, the bearing liner bonded to the outer race and forming a bearing surface against the outer surface of the inner race.

Other features or advantages of the invention will become apparent to those of ordinary skill in the art upon review of the following detailed description, claims and drawings.

BRIEF DESCRIPTION OF THE DRAWINGS

FIG. 1 is a perspective view of a winding mandrel with a series of inner races mounted thereon and showing the external surfaces of the series of inner races coated with a parting agent.

FIG. 2 is a perspective view the winding mandrel of FIG. 1 showing a low friction material applied over the external surfaces of the inner races.

FIG. 3 shows the winding mandrel of FIG. 2 in cross section and a low viscosity resin applied over the fabric.

FIG. 4 is a cross section of the winding mandrel of FIG. 3 with high viscosity resin applied to fill radial irregularities.

FIG. 6 is a cross section of the winding mandrel of FIG. 4 having an overlayment of resin-impregnated filaments applied over the fabric and high viscosity resin filling the radial irregularities in the fabric.

FIG. 8 is a cross section of the winding mandrel of FIG. 6 showing finishing of the cured overlayment to a desired external dimension, FIG. 9 is a cross section of the winding mandrel of FIG. 8 showing cutting of the finished overlayment to sever individual thrust bearing assemblies, FIG. 10 is a partially cut away perspective view of a thrust bearing assembly severed from the mandrel of FIG. 9.

FIG. 12 is a cross section of an alternative thrust bearing assembly produced using in inner race having different radial irregularities formed in the inner race external surface,

DESCRIPTION OF THE PREFERRED EMBODIMENT

Figure 5:
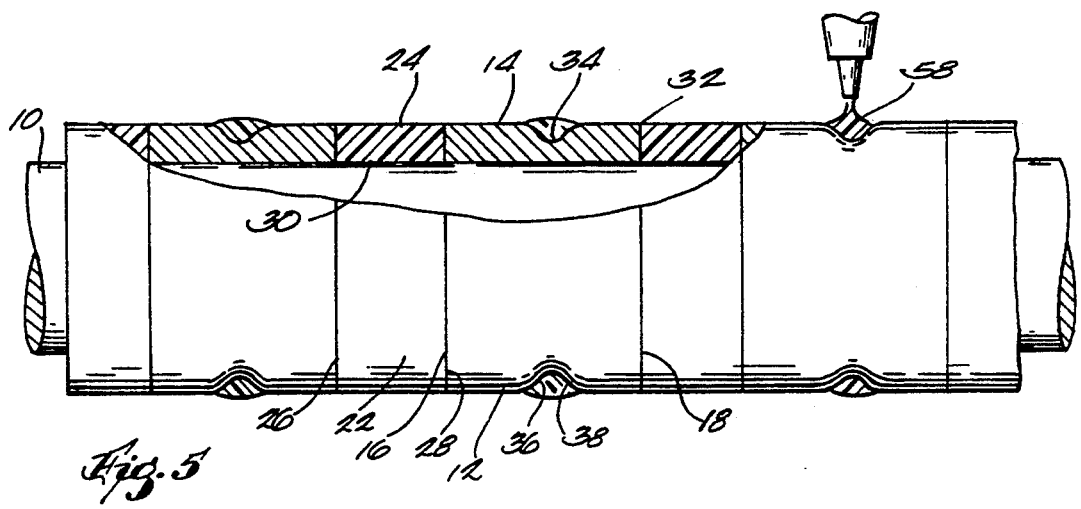
FIG. 5 shows a cross section of an alternative winding mandrel wherein high viscosity resin is applied directly to the inner race external surfaces to fill radial irregularities therein.

Referring to the drawings, the process first comprises providing a mandrel 10 (FIG. 1). An inner bearing element or race 12 having an outer peripheral surface 14, opposite ends 16 and 18 and a bore 20 (FIG. 2) is mounted on mandrel 10. The inner race 12 is preferably stainless steel. The bearing outer surface 14 may comprise a bearing quality finish, preferably a corrosion protection surface such as a hard chrome or electroplated nickel. A surface thickness of approximately 0.0005 to 0.0010 inches is desirable for this purpose. In FIG. 1 a plurality of such inner races 12 are mounted on a single mandrel 10, and the process will be described in reference to using such a plurality, although the steps of the process to be described could be applied as well to a single race 12 mounted on a mandrel 10. Spacer elements 22 are preferably utilized at the interfaces 21 to separate individual inner races 12 along the mandrel 10, with said spacer elements 22 each having an outer peripheral surface 24, opposite ends 26 and 28 and a bore 30. The outer surfaces 14 of the plurality of inner races 12 collectively forms a mating surface 32 for subsequent forming operations. When spacer elements 22 are used, as shown in FIGS. 1 through 9, the collective inner race outer surfaces 14 and spacer outer surfaces 24 together form the mating surface 32.

Referring to FIGS. 1, 3 and 4, the bearing outer surface 14 includes one or more radial irregularities 34 forming annular axial thrust resisting means, or areas 36 and 38. The irregularities 34 are preferably concave or convex annular formations in the peripheral surface 14. Irregularities in the form of an annular groove or annular beaded elevations are preferred. Multiple irregularities 34 may be utilized to increase thrust resistance against axial loads. The depth or height of the irregularities 34, as well as the number, will affect the axial load supporting capacity.

In the preferred embodiment shown in FIGS. 1 through 11, the irregularity 34 is a simple annular groove in the inner race external surface 14. Each groove has opposed facing surfaces that form the annular axial thrust resisting areas 36 and 38. With this configuration thrust loads will be supported in both axial directions, as it would with an annular beaded elevation. When an irregularity 34 in the form of an annular groove or bead is provided at each axial end of the bearing external surface 14, an additional advantage is found in that together they may cooperate to form a seal to keep contaminants out of the intermediate bearing area intermediate the grooves.

The collective mating surface 32 is next coated with a suitable parting agent 40 (FIG. 1). Many suitable silicone materials are known for this purpose. In the preferred process two layers of parting agent 40 are pre-applied to the inner races 12 and spacers 22 prior to assembly on the mandrel 10. Preferably each pre-application is accomplished on all surfaces by submersing the inner races 12 and spacers 22 in parting agent 40 and subsequently baking the components to fix the parting agent 40. A sealant, not shown, may be provided between the adjoining end faces 16 and 18 of the inner races 12, or between the inner race ends 16 and 18 and spacer ends 26 and 28, when spacers are used. This sealant may comprise a semi-liquid coating applied during assembly, or may comprise thin compressible washers, not shown, which are assembled on the mandrel 10 intermediate the inner races 12.

In a preferred embodiment (FIG. 2) formation of the rest of the thrust bearing is initiated by first applying a layer of self-lubricating conformable material, or fabric 42 over the mating surface 32. The fabric 42 comprises fibers of self-lubricating material, and preferably comprises interwoven fibers of both self-lubricating and shrinkable materials. A preferred fabric 42 is described in U.S. Pat. No. 3,804,479, the teachings of which are incorporated herein by reference, comprising lengthwise yarns predominantly of self-lubricating fibers, such as TEFLON fibers, and circumferential yarns of a material, for example DACRON yarn, which shrinks when heated to 300° F.

For ease of application the fabric 42 can be woven into a sleeve 44 which can be slid over the mating surface 32, as shown in FIG. 1. The sleeve 44 may be produced of any continuous length, and can be stored on a reel, not shown, until required. The length of the sleeve 44 applied over the mating surface 44 should be on the order of 10% greater than the length of mating surface 44 to permit gathering of fabric 42 into the radial irregularities (FIG. 2).

Conformation of the fabric 42 having heat shrinkable fibers is accomplished by heating the fabric 42 to shrink the shrinkable material, which tightly conforms the fabric 42 to the mating surface 32. An alternative means for conforming the fabric 42 to the mating surface 32 comprises applying the fabric sleeve 44 loosely over the mating surface 32 and stretching the fabric 42 axially, which concomitantly diminishes the circumference of the fabric sleeve 44 and thereby tightens the fabric 42 over the mating surface 32. In some cases stretching alone will conform the fabric 42 to the mating surface 32 to sufficient degree.

Upon conformation of the fabric 42, by whatever means, FIG. 3, the fabric 42 forms a low friction bearing liner surface 46 having intimate contact and conformation with the mating surface 32. The bearing surface 46 will constitute the load supporting surface in the completed bearing. The bearing surface 46 includes outer race axial thrust resisting areas 48 and 50 mating with the inner race axial thrust resisting areas 36 and 38, respectively. The fabric 42 also has an outer exposed bonding surface 52 that includes fabric radial irregularities 54 conforming to the inner race radial irregularities 34.

A low viscosity resin 56 is applied over the fabric bonding surface 52. The resin 56 should have a sufficiently low viscosity as applied to the fabric 42 to facilitate filling the interstices of the fabric 42 by capillary action. Epoxy resin is preferred for this purpose. The low viscosity resin 56 only needs to coat the bonding surface 52 at the region of the radial irregularities 52, for reasons that will be explained in detail.

A hardenable high viscosity resin 58 is then applied, as shown in FIG. 4, to the radial irregularities 54 in an amount sufficient to fill recessed portions of the radial irregularities 54. The high viscosity resin 58 should have a paste, gel or putty-like consistency, and may be applied to the irregularities 54 by extruding a bead of high viscosity resin 58 into the irregularities 54 while the mandrel 10 is slowly rotated, until the volume of the irregularities 54 is completely filled. The viscosity of the high viscosity resin 58 should be low enough to allow the resin 58 to flow and completely fill the irregularities from side to side, and yet high enough to resist exclusion from the irregularities 54 when exposed to forces of subsequent forming operations, which will be described in detail. The initial wetting of the fabric 42 by the low viscosity resin 56 is necessary to establish a resin-matrix mesh between the fabric 42 and the high viscosity resin 58, as the high viscosity resin 58 will not penetrate the interstices of the fabric 42 as the low viscosity 56 resin will.

The high viscosity resin 58 may be made thixotropic by filling a low viscosity resin 56 with CAB-O-SIL (Trademark for fire dried formed silica $S_iO_2$ having a surface area between 200 and 400 $m^2$/gm). A liquid filled by such a compound is rendered thixotropic, i.e., is gel-like becoming fluid when disturbed. A thixotropic high-viscosity resin will generally be easier to apply, as it can be applied while in a fluid state. The high viscosity resin 58 can be filled by mixing a fiberglass scrape or swarf 80, shown in FIG. 8, resulting from grinding operations on cured fiberglass material. Swarf may be used to affect certain characteristics in the finished bearing in a manner to be described in detail.

When the highly polished bearing surface 14 on the outer periphery of the inner race 12 is to be utilized as a bearing surfacer with no application of low friction material (FIG. 5), the steps of applying fabric 42 and low viscosity resin 56 are omitted and the radial irregularities 34 are filled directly with a high viscosity resin 58.

Figure 7:
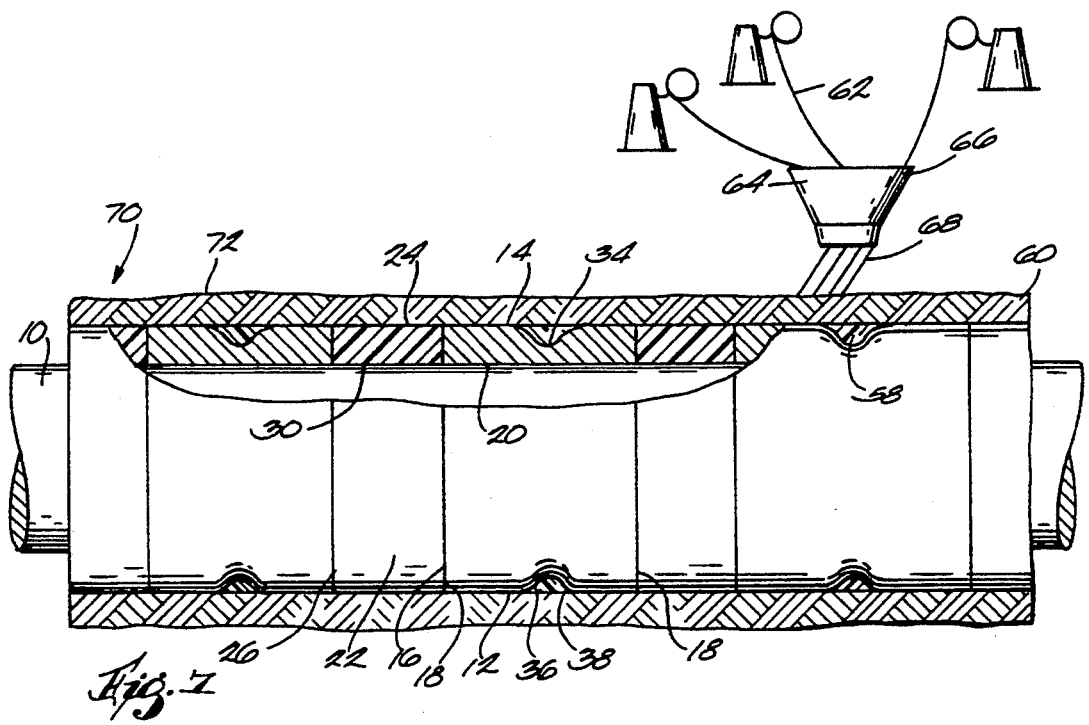
FIG. 7 is a cross section of the winding mandrel as depicted in the embodiment of FIG. 5 showing an overlayment of resin-impregnated filaments applied over the inner race external surfaces and the high viscosity resin filling the radial irregularities in external surfaces.

The completed bearings are formed by next applying an overlayment 60 of resin impregnated filaments 62 on the inner race outer surface 14 (FIGS. 6 and 7). The filaments 62 are applied to bridge over the radial irregularities 34 without filling depressions therein. The radial irregularities 34 in the bonding surface thereby remain filled with the high viscosity resin 58. FIG. 7 discloses filament winding directly over the inner race outer surface 14 when no fabric 42 has been previously applied.

A preferred method for applying the filaments 62 is through a filament winding process much as that described in U.S. Pat. No. 3,974,009, the teachings of which are incorporated herein by reference. In this method a hardenable liquid resin 64 is supplied simultaneously with the winding of the filaments 62 (FIG. 6), by passing the filaments 62 through a bath 66 of liquid resin 64 prior to winding. In FIG. 6 the resin bath 66 is a cone-shaped receptacle. The filaments 62 pass downwardly through the bath 66 and through a ring which comprises the lower end of the bath 66. Preferably a plurality of filaments 62 will be oriented parallel to each other, and will form a tape 68 of resin-impregnated filaments 62. The bath 66 is supported on a reciprocating carriage, not shown, and by repeated passes of the tape 68 over a rotating mandrel 10 a plurality of filament layers are applied to form the filament wound overlayment 60. The direction of the winding changes when the tape 68 nears the ends of the mandrel 10, and the filaments 62 are thus helically wound in overlapping layers. The angle of wind on the mandrel 10 should be kept large to cause the filaments 62 to bridge over the radial irregularities 54 in the process depicted in FIGS. 6 and 34 in the process depicted in FIG. 7, respectively. The winding is done under tension, and a pressure is exerted by the filaments 62 on the order of 2 to 4 lbs/inch. If the filaments 62 were applied directly into the radial irregularities 54 and 34 at a low winding angle, the pressure applied by the filaments 62 will force some of the high viscosity resin 58 from the radial irregularities 54 and 34. With greater winding angles the filaments 62 bridge over the radial irregularities 54 and 34 which decreases the chance that the force from filament winding will displace high viscosity resin 58 from the radial irregularities 54 and 34. With very great winding angles it may be possible to utilize a less viscous high viscosity resin 58 than would be possible using narrow winding angles. When narrow winding angles are utilized a higher viscosity high viscosity resin 58 is required to be certain to exclude the fiberglass filaments 62 from the radial irregularities 54 and 34. Thus, the higher the viscosity of the high viscosity resin 58 and the greater the winding angle, the less likely it is that filaments 62 will enter the depressions of the radial irregularities 54 and 34.

There may be a slight swag or dip of the fiberglass filaments 62 into the recessed portions in the radial irregularities 54 and 34. A small amount of fiberglass 62 in irregularities is tolerable, and in fact some small dipping of the fiberglass 62 within the external portions of the depressions in the radial irregularities 54 and 34 serves to strengthen the axial stress resistance of the finished bearings.

When the winding of the overlayment 60 is completed, the tape 68 is cut and secured, providing an unhardened elongated cylindrical member 70 having a substantially uniform exterior surface 72. The cylindrical member 70 includes the filament wound overlayment 60, the high viscosity resin 58, the low viscosity resin 56 and the self-lubricating fabric 42. The cylindrical member 70 could be cured on the winding machine. Preferably, the mandrel 10 is removed from the winding machine, and handled at its ends until curing, or hardening, of the unhardened elongated cylindrical member 70 can be effected. Curing can be at elevated or ambient temperatures, and by any known method, such as by heating in an oven, not shown. The resin can also be heated directly, such as by infra red or high frequency radio radiation. As may be required, the mandrel 10 can be rotated during the curing cycle to prevent dripping. The time for cure typically depends on temperature and catalyst, when the latter is present. Curing the cylindrical member 70 integrally bonds the fabric 42, resins 56 and 58, and overlayment 60 together in a hardened cylindrical member 74 having bonded filaments 62 extending circumferentially within (not shown). The mandrel 10 is preferably kept within the inner races 12 to provide an arbor for subsequent machining operations.

The hardened cylindrical member 74 is then finished, as shown in FIG. 8, to a desired outer finished dimension 76 by a grinding or machining tool 78. As the depressions of the radial irregularities 54 were filled with high viscosity resin 58 prior to filament winding, there is a more uniform outer dimension 72 in the unhardened cylindrical member, and thus there is less grinding necessary to form a uniform hardened outer dimension 76, (FIG. 6) and consequently less fiberglass material needs to be used in the filament winding process. The unhardened cylindrical member 70 may be built up evenly to an as formed dimension 72 that is very close to a desired uniform outer finished dimension 76 for the hardened cylindrical member 74, thus necessitating only a small degree of finishing.

Swarf 80 is produced from the grinding and may be mixed with a low viscosity resin to produce a thickened high viscosity resin for use in subsequent forming operations. Swarf 80 can be added as a filler to high viscosity resin to form a filled resin 58 for subsequent forming operations, and the fiberglass swarf 80 may also be added to thixotropic resin to create a filled thixotropic resin.

The finished hardened cylindrical member 74 is severed at adjacent bearing interfaces 21, FIG. 9, such as by application of a cutting tool 82, to separate individual thrust bearing assemblies 84. The outer dimension 76 may be finished after the bearing assemblies 84 have been so separated. As seen in FIG. 10, the bearing assembly 84 comprises an inner race 12 having axial thrust resisting areas 36 and 38, and an outer race 86 conformed to and rotatably mounted on the outer peripheral surface 14 of the inner race 12. The outer race 86 is bonded to the fabric 42 supporting annular axial thrust resisting areas 48 and 50 mated to the thrust resisting areas 36 and 38 of the inner race 12. A major body portion 88 of hardened filament wound fiberglass overlayment 60 is bonded to the hardened high viscosity resin 58 in the radial irregularities 54 of the fabric 42. As the filaments 60 were orientated to bridge over the radial irregularities during filament winding, only hardened high viscosity resin 58 is present in the radial irregularities 54. The interface of inner and outer races 12 and 86 is supported by the inner surface 46 of the bearing fabric 42. This bearing liner surface 46 is conformed to and rotatably mounted on the inner race outer peripheral surface 14, the bearing liner surface 46 having thrust resisting areas 48 and 50 and supported within the inner race radial irregularities 54 by hardened high viscosity resin 58. The hardened high viscosity resin 60 is bonded to the fabric 42 by hardened low viscosity resin 56, and is bonded directly to the outer race major body portion 88 away from the fabric 42. At areas axially removed from the radial irregularities 34, the outer race major body portion 88 is bonded directly to the bearing fabric 42.

Figure 11:
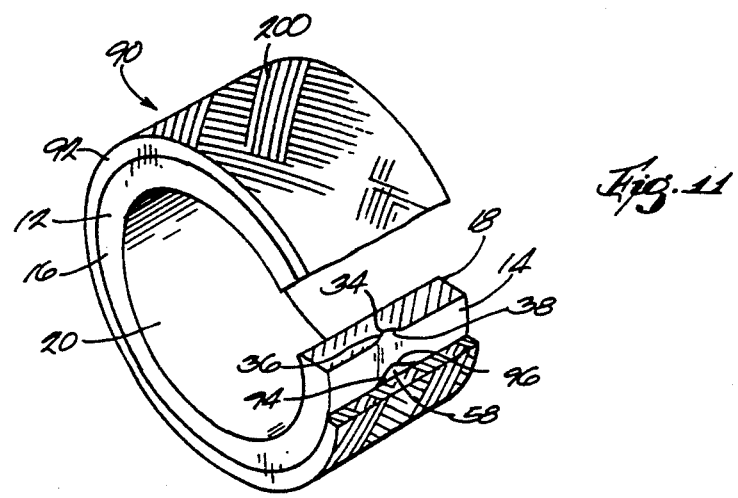
FIG. 11 is a partially cut away perspective view of an alternative thrust bearing assembly produced from an overlayment such as that depicted in FIG. 7.

In the embodiment of FIG. 11, the bearing assembly 90 comprises an inner race 12 having axial thrust resisting areas 36 and 38, and an outer race 92 conformed to and rotatably mounted on the outer peripheral surface 14 of the inner race 12. The outer race 92 is not bonded to fabric but rather the hardened high viscosity resin 58 filling the radial irregularities 34 of the inner race outer surface 14 forms thrust resisting areas 94 and 96. A major body portion 98 of hardened filament wound fiberglass overlayment 60 is bonded to the hardened high viscosity resin 58 in the radial irregularities 34.

In the embodiment of FIG. 12, a bearing assembly 100 is shown having radial irregularities formed by adjacent annular beads 102 and 104 formed on the inner race outer surface 14. The beads 102, 104 define annular axial thrust resisting areas 106 and 108 and 110 and 112, respectively. A depression 114 lies between annular axial thrust resisting areas 108 and 110, and the depression 114 is filled with hardened high viscosity resin 58. The process for producing the bearing assembly 100 is otherwise identical to that utilized in producing the bearing assembly 84 shown in FIG. 10, including the step of applying fabric 42 over the inner race outer surface 14 prior to application of high viscosity resin 58.

The advantages of the bearing assembly 84 produced by the process described arises from the fact that the outer race 86 is not fixed in rigid form until the cure temperature is achieved. At this temperature the steel inner race 12 is expanded to the maximum level of expansion it will achieve during cure. Upon cooling to room temperature, the inner race 12 and outer race 86 contract from their respective expanded states. Because the coefficient of expansion of steel is greater than that of glass, the inner race 12 contracts upon cooling to a greater degree than the fiberglass outer race 12, the latter only becoming fixed and rigid at the elevated cure temperature. Steel has a coefficient of expansion of approximately 0.000006 inches/inch/degree Fahrenheit, while glass has a coefficient of expansion of about 0.0000002 inches/inch/degree Fahrenheit.

Thus, when a substantial amount of fiberglass has been used to fill a depression of radial irregularities 34 of the inner race 12, upon cooling from cure temperature the greater contraction of the steel will tighten the axial thrust resisting areas 36 and 38 of the inner race 12 onto intervening fiberglass fill areas of the outer race 86. The greater the proportion of fiberglass in the high viscosity resin 58, the greater the relative tightness of inner race 12 and outer race 86 in the bearing assembly 84. However, as the coefficient of expansion of resin is much greater than steel, approximately 0.000030 inches/inch/degree Fahrenheit for resin, when a high proportion of resin is utilized in the high viscosity resin 58 to fill between axial thrust resisting areas 36 and 38, upon cooling the cured outer race 86 the resin fill will axially contract to a greater degree than the steel inner race. With the present invention, this contraction at the axial thrust resisting areas 36 and 38, results in a close tolerance running fit that allows free relative rotational movement between inner race 12 and outer race 86.

By varying the amount of swarf added as a filler, the relative proportion of fiberglass in the thixotropic resin can be controlled, which allows predetermination of the coefficient of expansion of the fiberglass composite fill of the outer race. The swarf from grinding the peripheries of previous outer races will be a combination of fiberglass and resin. In controlling the coefficient of expansion of the resin occupying the peripheral depressions, the relative percentage of ground glass and ground hardened resin within a given swarf should therefore be taken into account. In this manner the degree of running tolerance between inner and outer races may be preselected, by determining preferred relative coefficients of expansion of the steel inner race and the outer race fill resin, and then selecting a fiberglass to resin ratio for the high viscosity fill resin which will yield a fiberglass composite with the proper coefficient of expansion relative to that of steel. An additional advantage of utilizing the grinding swarf in this manner is that the swarf is recycled into a usable material.

From the foregoing description, one skilled in the art can make various changes and modifications to adapt the invention to various usages and conditions without departing from the spirit and scope of the invention.

What is claimed is:

1. A thrust bearing assembly comprising;
   an inner race including an outer peripheral surface having one or more annular axial thrust resisting means;
   a bearing liner of self-lubricating material conformed to and rotatably mounted on said outer peripheral surface, said bearing liner having radial irregularities in the area of its conformation to said thrust resisting means that are filled with a hardened low viscosity bonding resin and a hardened high viscosity resin; and
   an outer race of filament wound fibers bonded to said bearing liner.

2. The thrust bearing assembly according to claim 1 wherein said filament wound fibers are oriented to bridge over said radial irregularities on said bearing liner so that only hardened bonding and high viscosity resins are present in said radial irregularities.

3. A thrust bearing assembly comprising;
   an inner race including an outer peripheral surface having one or more annular inner race axial thrust resisting means;
   and outer race conformed to and rotatably mounted on said inner race outer peripheral surface, said outer race having annular outer race axial thrust resisting means in the area of its conformation to said annular inner race axial thrust resisting means that are filled with a hardened high viscosity resin and a major body portion surrounding said annular outer race axial thrust resisting means made of resin-impregnated filament wound fibers bonded to said hardened high viscosity resin.

4. The thrust bearing assembly according to claim 3 wherein said filament wound fibers are orientated to bridge over said annular inner race axial thrust resisting means on said inner race outer peripheral surface so that only said hardened high viscosity resin forms said annular outer race axial thrust resisting means.

* * * * *